(12) United States Patent
Lo Conte et al.

(10) Patent No.: US 10,468,911 B2
(45) Date of Patent: Nov. 5, 2019

(54) SWITCHING SYSTEM AND METHOD FOR ACTIVATING AND DEACTIVATING OF AN ELECTRICAL APPLIANCE

(71) Applicant: ESMART Technologies SA, Ecublens (CH)

(72) Inventors: Fabrizio Lo Conte, Lausanne (CH); Laurent Fabre, Lausanne (CH); Andrew Watson, Ollon (CH)

(73) Assignee: eSMART Technologies SA, Ecublens (CH)

( * ) Notice: Subject to any disclaimer, the term of this patent is extended or adjusted under 35 U.S.C. 154(b) by 50 days.

(21) Appl. No.: 15/549,593

(22) PCT Filed: Feb. 10, 2016

(86) PCT No.: PCT/IB2016/050689
§ 371 (c)(1),
(2) Date: Aug. 8, 2017

(87) PCT Pub. No.: WO2016/128901
PCT Pub. Date: Aug. 18, 2016

(65) Prior Publication Data
US 2018/0041031 A1 Feb. 8, 2018

(30) Foreign Application Priority Data

Feb. 10, 2015 (CH) .......................... 163/15

(51) Int. Cl.
*H02J 3/14* (2006.01)
*H02J 13/00* (2006.01)

(52) U.S. Cl.
CPC ............ *H02J 13/0048* (2013.01); *H02J 3/14* (2013.01); *Y02B 70/3225* (2013.01);
(Continued)

(58) Field of Classification Search
CPC ..... H02J 3/14; H02J 13/0048; Y02B 70/3225; Y02B 70/3266; Y04S 20/222;
(Continued)

(56) References Cited

U.S. PATENT DOCUMENTS

| 4,322,632 A | 3/1982 | Hart et al. |
| 4,465,956 A | 8/1984 | Fowler |

(Continued)

FOREIGN PATENT DOCUMENTS

| EP | 0837537 A1 | 4/1998 |
| EP | 1066690 A2 | 1/2001 |

(Continued)

OTHER PUBLICATIONS

International Search Report and Written Opinion for PCT/IB2016/050689, dated Nov. 16, 2016, 5 pages.

*Primary Examiner* — William Hernandez
(74) *Attorney, Agent, or Firm* — Blank Rome LLP (57) ABSTRACT

The invention concerns a switching system (6) for activating and deactivating of an electrical appliance (100) comprising a remote switch control device (9) that comprises a first terminal (90) electrically connected to a first power line (8), a second terminal (91) electrically connected to a second power line (7), and a third terminal (92) connectable to an electrical 5 terminal of the electrical appliance. The remote switch control device (9) is configured to modify the electrical connection between the first and the third terminal (90, 92) in response to a detection of an attenuation of an electrical parameter between the first and second terminals (90,91) caused by a electromechanical switch (1) configured to be manually actionable by 10 a user. The invention further concerns the remote switch control device (9) and a method for installing a switching system using the remote switch control device (9) and the electromechanical switch.

21 Claims, 6 Drawing Sheets

(52) U.S. Cl.
CPC .......... *Y02B 70/3266* (2013.01); *Y04S 20/222* (2013.01); *Y04S 20/242* (2013.01)

(58) Field of Classification Search
CPC .. Y04S 20/242; Y10T 307/74; Y10T 307/937; Y10T 307/944; Y10T 307/977
USPC ................................. 307/112, 139, 140, 143
See application file for complete search history.

(56) References Cited

U.S. PATENT DOCUMENTS

| | | | | |
|---|---|---|---|---|
| 5,844,493 | A | * 12/1998 | Pohl | ..................... H01H 71/04 340/657 |
| 6,054,782 | A | 4/2000 | Girard et al. | |
| 2017/0121512 | A1 | 5/2017 | Vittorias et al. | |

FOREIGN PATENT DOCUMENTS

| | | |
|---|---|---|
| WO | WO-99/50971 | 10/1999 |
| WO | WO-2014/030121 A1 | 2/2014 |

* cited by examiner

SWITCHING SYSTEM AND METHOD FOR ACTIVATING AND DEACTIVATING OF AN ELECTRICAL APPLIANCE

RELATED APPLICATIONS

This application is a national phase of PCT/IB2016/050689, filed on Feb. 10, 2016 which claims the benefit of Switzerland Application No. 00163/15, filed on Feb. 10, 2015. This entire contents of those applications are incorporated herein by reference.

The present invention concerns a switching system for activating and deactivating of an electrical appliance comprising a remote switch control device remotely controllable by a switch, in particular for home lighting appliances.

DESCRIPTION OF RELATED ART

EP0837537 discloses a control device employing a plurality of remote switches for activating and deactivating of electrical devices. Each remote switch generates a predefined number of electric pulses, when actuated by a user, on an electrical line connected to an electrical circuit dedicated to count the number of received pulses. According to the number of received pulses, a pre-selected function is then executed by the control device. The disclosed set of pre-selected functions comprises the activation and the deactivation of electric appliances. However, the device requires a first electrical line arrangement for the generating of control electrical pulses and a second electrical line arrangement for activating and deactivating electrical appliances.

U.S. Pat. No. 4,465,956 discloses a control circuit for switching dual function electrical appliances, in particular for use in controlling multi-speed electrical ceiling fans having light fixtures mounted therein. Two independent signals comprising either positive pulses or negatives pulses are produced by a two-button switch and transmitted to the fan and light control circuit through the hot line of the cable. The control circuit identifies whether each pulse is positive or negative and counts the number of received pulses in both the positive and negative phase. According to the counted positive and negative pulses, the control circuit enables various applications of the light and of the fan. However, the control circuit requires a two button switch specially adapted to intercept and stop either the positives phases or the negative phases of the AC power signal while having a rest position permitting the pass of both positives and negatives phases of the AC power signal. Moreover, each of the dedicated circuits of the control circuit have to be designed and realized in order to be able to work with half-waved AC power signal.

Switching systems for remotely activating and deactivating of a Home electrical appliance, like lighting, a heating or a television, are already known. Such systems comprise a remote switch control device that could be wired or wireless controllable by a device, such as a smartphone or a tablet. However, the installation of a system being uniquely wireless controlled requires an unlimited local access to a power supply. If the system is configured for being wired-controlled, e.g. by a wall- or surface-mounted switch, the system requires an installation of additional cables for providing the wired control.

BRIEF SUMMARY OF THE INVENTION

The aim of the invention is to provide a switching system for activating and deactivating of an electrical appliance destined for being wired-controlled with a reduced number of wires.

Another aim of the invention is to provide a switching system for activating and deactivating of an electrical appliance suitable to be locally installed in place having a limited access to a conventional power supply.

Another aim is to provide a switching system comprising a remote switch control device configured for activating and deactivating of an electrical appliance that is substantially permanently installed on (or inside) an internal or external wall or ceiling of a building, in particular wherein the powering of the appliance is controlled by a single line that is directly integrated, e.g. cemented, within the wall/ceiling.

According to the invention, these aims are achieved by means of a switching system, a remote switch control device and a method for installing a switching system for activating and deactivating an electrical appliance.

In particular, this aim is achieved by means of a switching system for activating and deactivating of an electrical appliance, the switching system comprising a remote switch control device that comprises:
  a first terminal electrically connected to a first line of a power line;
  a second terminal electrically connectable to a second line of the power line and connectable either to the first power supply terminal of the electrical appliance or to a first electrical terminal of a power plug outlet for powering the electrical appliance;
  a third terminal connectable either to the second power supply terminal of the electrical appliance or to the second electrical terminal of the power plug outlet;
  a controllable switching circuit arranged to modify the electrical connection between the first terminal and the third terminal; and
  a detection circuit arranged to detect an attenuation of an electrical parameter, like for example power, voltage, effective rms voltage, current, or effective current between the first and second terminals and arranged to control said controllable switching circuit;

the switching system further comprising
a first electromechanical switch operating on an electrical connection linking a first and a second electrical contact; the first electromechanical switch being configured to be manually actionable by a user;
wherein the first electromechanical switch is configured for acting on the electrical connection linking in such a way to produce, when actuated, a modification of an electrical parameter of the electrical connection linking the first and the second contact;
and wherein said first electromechanical switch is electrically connected either between the first line and the first terminal of said remote switch control device or between the second line and the second terminal of said remote switch control device.

According to the invention, the power line can comprise a plurality of wires or cables or electrically conductive elements providing power supply, at least two (or a combination of) electrically distinct wires or cables or electrically conductive elements. According to the invention, the first, respectively the second, power line could be a distinct wire or cable or electrically conductive element of the power line.

Advantageously, the first electromechanical switch is configured, when actuated, to generate a modification of the electrical parameter of the electrical connection linking during a time period comprised in a range from 10 μs to 2 s.

Advantageously, the detection circuit is configured to act on the controllable switching circuit when the detected attenuation lasts for a period comprised in a range from 10 µs to 2 s.

The switching system is thus apt to operate with attenuations lasting within a pre-defined range, e.g. from 10 µs to 2 s, causing thus limited, up to none, power troubles affecting the operability of the electrical appliance.

Moreover, the switching system operating with attenuations lasting within a pre-defined range, e.g. from 10 µs to 2 s, permits to efficacy configure the remote switch control device in such a way to be electrically fault resistant against such attenuation, e.g. without battery pack.

Another aim of the invention is to provide a remote switch control device and a switching system adapted to operate with legacy switches configured for being manually actuated, typically wall- or surface-mounted, such as break-before-made switches.

Another aim of the invention is to provide or facilitate interoperability with a home automation solution.

In an embodiment, the first switch is a break-before-make switch having a first contact that can be connected to either one of a second and a third contact of the first switch;
  wherein said second and third contacts of the break-before-make switch are electrically connected together;
  wherein said first break-before-make switch is electrically connected between the first line and the first terminal of the remote switch control device or between the second line and the second terminal of the remote switch control device. Preferably, the first break-before-make switch is electrically connected between the first line and the first terminal; and the first line is a phase line of the power line and the second line is a neutral line of the power line.

In an embodiment, the switching system further comprises an electrical plate or wire; wherein the electrical plate or wire is arranged to provide electrical connection between the second and third contacts of the first switch. Advantageously, the electrical connection is located internally a casing of the first break-before-make switch or within a range of 30 cm from the location of the first break-before-make switch.

In a preferred embodiment, the first break-before-make switch is electrically connected between a phase line of the power line and the first terminal of the remote switch control device; wherein the second terminal of the remote switch control device is electrical connected to a neutral line of the power line.

In an embodiment, the switching system further comprises a second switch that is electrically connected between the first switch and the first or second terminal of the remote switch control device. The second switch could be a make-before switch having his second and third contacts electrically connected together.

In a preferred embodiment, the first and/or second switch are electromechanical switches adapted for home lighting applications.

In one embodiment, the first break-before-make switch and/or the second break-before-make switch comprise a shaping circuit.

In another embodiment, the shaping circuit comprises an electrical circuit. Advantageously, the shaping circuit could comprise a microprocessor, arranged to communicate by power line communication over the first, the second and/or the third terminal of the remote switch control device.

In an embodiment, the switching system comprises a communication interface or system.

In one embodiment, the microprocessor is be arranged to generate a predefined voltage pattern over the first, the second and/or the third terminal of the remote switch control device, during the power attenuation generated by the break-before-make switch.

In one embodiment, the microprocessor is powered by a standalone powering unit, in particular by a battery pack or a single battery.

In a preferred embodiment, the break-before-make switch is an electromechanical switch adapted for home lighting applications.

Respect to prior art, the invention permits and facilitates interoperability with conventional 2-way lighting circuit portions that comprises at least an electromechanical break-before-make switch, without requiring additional line or wire for providing a wired-control, nor modifying the electromechanical core of the break-before-make switch.

According to the invention, this aim is further achieved by means of a remote switch control device for activating and deactivating of an electrical appliance comprising:
  an first terminal;
  a second terminal;
  an third terminal connectable to a power supply terminal of the electrical appliance;
  a controllable switching circuit arranged to modify the electrical connection between the first terminal and the third terminal; and
  a detection circuit arranged to detect an attenuation of an electrical parameter, like for example power, voltage, effective rms voltage, current, or effective current between the first and second terminals and to control said controllable switching circuit.

Preferably, the remote switch control device further comprises a power supply arranged to power the controllable switching circuit and the detection circuit from the first and/or second terminal. Preferably, the remote switch control device further comprises an electrical energy storing element arranged to power said controllable switching circuit and said detection circuit during said attenuation, in particular during said power interruption.

In one embodiment, the remote switch control device further comprises a communication interface or system. The communication interface or system could be a Power Line Communication interface or unit. The communication interface could also be a radio interface. The communication interface could comprise an electrical circuit and/or a microprocessor.

In an embodiment, the third terminal is connectable to a power plug outlet, in particular to a wall power plug outlet. In an embodiment, the second terminal of a remote switch control device is connectable to a second power supply terminal of the electrical appliance.

In another embodiment, the electrical appliance is a light appliance, in particular a lighting fixture, a chandelier. The third terminal is connectable to a power supply terminal of a light appliance, in particular of a lighting fixture or of a chandelier. In an embodiment, the second terminal of a remote switch control device is connectable to a second power supply terminal of the light appliance, in particular of a lighting fixture or of a chandelier.

According to the invention, this aim is further achieved by means of a method for installing a switching system for activating and deactivating an electrical appliance having a first and a second power supply terminals, comprising a steps of:
  installing a remote switch control device comprising: a first terminal, a second terminal, a third terminal, a controllable switching circuit arranged to modify an electrical connection between the first terminal and the third terminal of the switching system, and a detection circuit arranged to detect an attenuation of an electrical parameter, like for example power, voltage, effective rms voltage, current, or effective current between the first and second terminals and arranged to control said controllable switching circuit; wherein said step of installation of said switching system comprises a step of electrically connecting the first terminal electrically to a first line of a power line, the second terminal to a second line of the power line and the third terminal to either the first power supply terminal of the electrical appliance or to an electrical connector of a power plug outlet suitable for powering the electrical appliance;

installing an electromechanical switch for being electrically connected between the first line and the first terminal of said remote switch control device or between the second line and the second terminal of said remote switch control device; the electromechanical switch being arranged to operate on an electrical connection linking a first and a second electrical contact of the electromechanical switch and configured to be manually actionable by a user; wherein said step of installing the electromechanical switch comprises a step of:

configuring the electromechanical switch in such a way to produce, when actuated, a modification of an electrical parameter of the electrical connection linking the first and the second contact during a predefined time period.

The electromechanical switch could be a break-before-make switch that is arranged to electrically connect the first contact to either one of the second and a third contact of the break-before-make switch. Thus, the step of installing the electromechanical switch could further comprise a step of electrically connecting together the second and the third contacts of the break-before-make switch.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

The present invention concerns a switching system for activating and deactivating of an electrical appliance that is wired-controlled by a remote switch, in particular for home appliances and home lightings whose powering is controlled by a 1-way wire power line, typically controlled by a plurality of switches interconnected together by a multiple-way wire, e.g. 2-way wire.

Figure 1A:
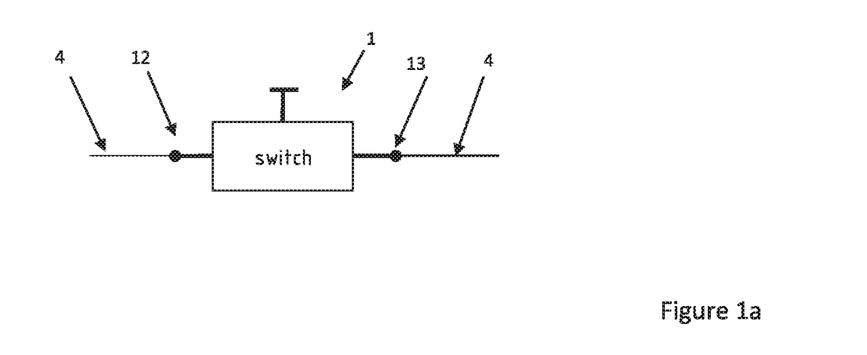
FIGS. 1*a,b* shows a view of an electromechanical switch, while the FIG. 1*b* shows a break-before-make switch 10 used in the invention.
Figure 1B:
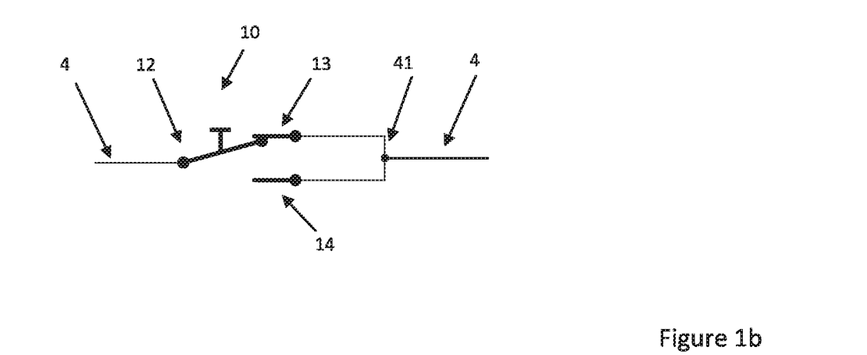

The switches used within the switching system of the invention are schematically illustrated by FIGS. 1*a* and 1*b*.

The FIG. 1*a* shows an electromechanical switch 1 operating on an electrical connection linking a first electrical contact 12 and a second electrical contact 13.

The switch is configured to be manually actionable by a user. The electromechanical switch 1 is configured to act on the electrical connection linking in such a way to produce, when actuated, a modification of an electrical parameter of the electrical connection linking the first 12 and the second contact 13.

Advantageously, the electromechanical switch 1 could be electrically and/or mechanically configured to generate an attenuation lasting a (substantially) predefined time, i.e. a time period that is comprised within a predefined range.

The electromechanical switch 1 could be configured to generate an attenuation whose duration is within a predefined min/max period independently from the actuating gesture of the user on the switch 1, i.e. the duration is substantially unmodifiable by the gesture. The switch 1 could generate successive attenuations whose durations could vary within the predefined range.

Alternatively, the electromechanical switch 1 could be mechanically configured to lead the gesture of the user in such a way to generate an attenuation whose duration is within a predefined min/max period.

The duration of the attenuation could be in a range from 10 µs to 2 s, eventually from 100 µs to 500 ms, advantageously in a range from 10 ms to 100 ms.

Such attenuations lasting within these ranges, e.g. from 10 µs to 2 s, from 10 µs to 2 s, eventually from 100 µs to 500 ms, reduce the power troubles that could affect the operability of the electrical appliance in such a way that the are no loss of operability or, when a loss of the operability is caused, this is not, or less, remarkable by the user, as today's electrical appliances are generally robust or less sensitive against power troubles within these ranges.

The electromechanical break-before-make switch 10 of the FIG. 1*b* is a widely used switch in nowadays electrical installation to turn on/off electrical appliances. The break-before-make switch 10 has a first contact 12 that can be connected to either one of a second 13 and a third contact 14 of the switch. Commonly, the switch is an electromechanically switch that could be manually actuated by a user.

The break-before-make switch 10 could be a single-pole double-throw (SPDT) switch, equally called Two-way switch (British electrical wiring name) or Three-way (American electrical wiring name).

The break-before-make switch 10 could be comprised in a more complex switch, as a Double-pole double throw (DPDT).

An insertion of the switch 10 in between of a power line, wherein the second 13 and a third 14 contact of the break-before-make switch are electrically connected together, permits to generate an attenuation of at least one electrical parameter, like for example power, voltage, effective rms voltage, current, or effective current up to an electrical interruption on a power line each times the switch is actuated. The attenuation lasts from the break of a stable electrical connection between the first terminal 12 and either of the second 13 and the third 14 terminal up to a make of another stable electrical connection between the first terminal 12 and either of the second 13 and the thirds 14 terminal.

According to the invention, a power line is a line adapted to conduct electrical power.

In the sense of the invention, the attenuation could be any attenuation of an electrical parameter whose magnitude is comprises in a range from 10% to 100% of the value of the electrical parameter that is supposed to be provided during a predefined period, and in particular in a range from 50% to 100% and in particular in a range from 75% to 100%.

In the sense of the invention, an electrical or power interruption could be any attenuation whose magnitude is comprises in a range from 95% to 100% of the power or of the voltage or effective rms voltage that is supposed to be provided during a predefined period, and in particular a magnitude of 100%.

Figure 2:
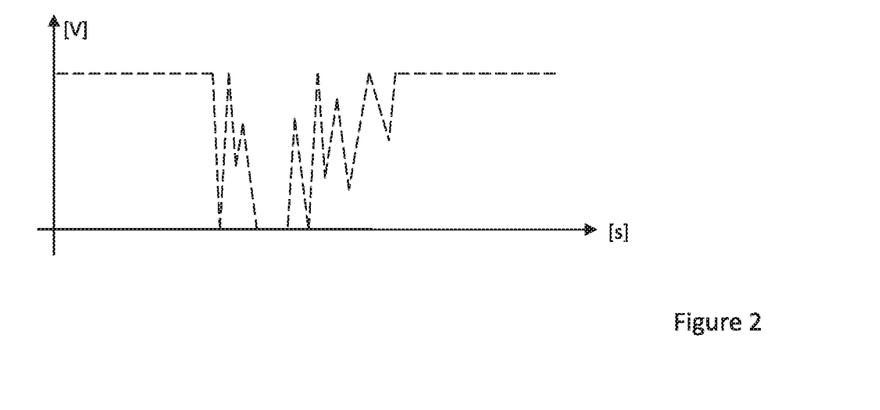
FIG. 2 illustrates a typical switching behavior of the break-before-make switch arrangement of FIG. 1*b*.

The FIG. 2 illustrates an example of switching behavior of a break-before-make switch 1 arrangement, when inserted in-between a DC power line as illustrated in FIG. 1b. The switching behavior could comprise a plurality of contact bouncing during the phases of contact breaking of a stable electrical connection and during the making of another stable electrical connection, causing electrical attenuation up to an electrical interruption. In-between these phases, the break-before-make switch causes a power interruption.

The break-before-make switch 10 could be inserted in-between of a 100-400V, AC single-phase or three-phase power line. In particular, in-between of a Home AC 120/240 Volt electrical circuit.

A shaping circuit or element 5 could be sequential and/or parallel electrically connected with the first terminal 12, the second and/or third terminal 13,14 of the switch 1,10 of FIG. 1a or FIG. 1b. The shaping circuit or element 5 could be arranged to change the electrical behavior of the switch during the switching operations, in particular to make the attenuation up to the interruption better suited to the purpose of detecting or to attenuate noisy generation on power supply.

The shaping circuit or element 5 could be used to modify a shape of the contact bouncing of the break-before-made switch.

In particular, the shaping circuit or element 5 could be used to filter or attenuate some components of the incoming electrical signal.

Figure 3:
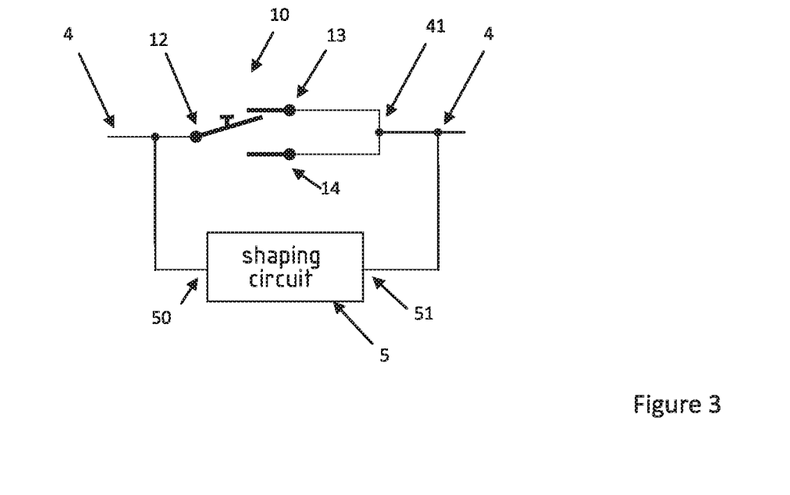
FIG. 3 shows a view of an electromechanical break-before-make switch arrangement comprising a shaping circuit.
Figure 4:
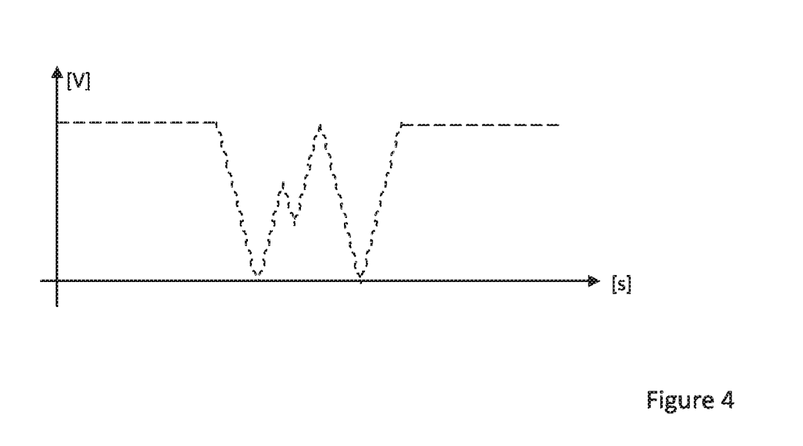
FIG. 4 illustrates a switching behavior of the switch arrangement of FIG. 3.

Moreover, the shaping circuit or element 5 could be arranged to introduce predefined signal pattern on one of the terminals 2, 13, 14 of the switch 1,10, as illustrated in FIGS. 3 and 4.

In the sense of the invention, a predefined pattern voltage could be any pattern voltage that is not destined to provide power supply to the electrical appliance.

The shaping circuit or element 5 could modify the AC power signal during the switching operations, for example modifying the electrical amplitude and/or the electrical frequency. For example, the shaping circuit or element 5 could generate an attenuation characterized by a predefined frequency or amplitude.

Advantageously, the shaping circuit or element 5 could introduce a predefined frequency pattern and/or a predefined amplitude pattern by filtering or shifting incoming AC signals.

A first terminal 50 of the shaping circuit or element 5 could thus be electrically connected to the first terminal 12 of the switch 1 while a second terminal 51 of the circuit or element 5 could be electrical connected to second terminal 13 (and third terminals 14) of the switch 1, 10.

A parallel shaping circuit comprising exclusively passives electrical elements requires neither an additional power supplying line, nor powering supplying circuits. A single capacitance, a diode, a resistor or a LC resonator could be thus used as shaping circuit or element 5. For example, positive AC or negative AC phases could be attenuated by a predefined attenuation from 10% to 100%.

Alternatively, the shaping circuit could comprise active components, e.g. a computational unit or microprocessor. A computational unit could be thus arranged to communicate by power line communication over the first, the second and/or the third terminal of the remote switch control device.

The switching system could further comprise a communication interface or system. The communication interface or system could be arranged to communicate by power line communication over the first, the second and/or the third terminal of the remote switch control device. The communication system could comprise an electrical circuit and/or a microprocessor. The communication system could cooperate with the shaping circuit equipping the break-before-make switch, e.g. by sharing at least part of the electrical circuit and/or the same microprocessor. The communication system could collect and send information about a state of the break-before-make switch and/or about a switching of the break-before-make switch by a user. The information could comprise additional information that are stored in a local memory equipping the communication system and/or the shaping circuit, e.g. an electronically identity of the break-before-make switch. The communication system could collect and send information provided by other electronic circuits equipping the break-before-make switch and/or the shaping circuit, e.g. sensors, human-machine interfaces and/or user interface.

Advantageously, the microprocessor could be arranged to generate a predefined voltage pattern over the first, the second and/or the third terminal of the remote switch control device, during the attenuation generated by the break-before-make switch. On one side, a predefined pattern voltage could electrically mark the attenuation or the interruption caused by the switch 1, 10, and on the other side, a predefined pattern voltage could provide information or commands to the electrical appliance and/or to other connected devices or switches, i.e. a home lighting appliances control unit.

Preferably, the microprocessor is powered by a standalone powering unit, in particular by a battery pack or a single battery. A standalone powering unit permits to powering the active circuit and the microprocessor without requiring an additional powering line.

Figure 5:
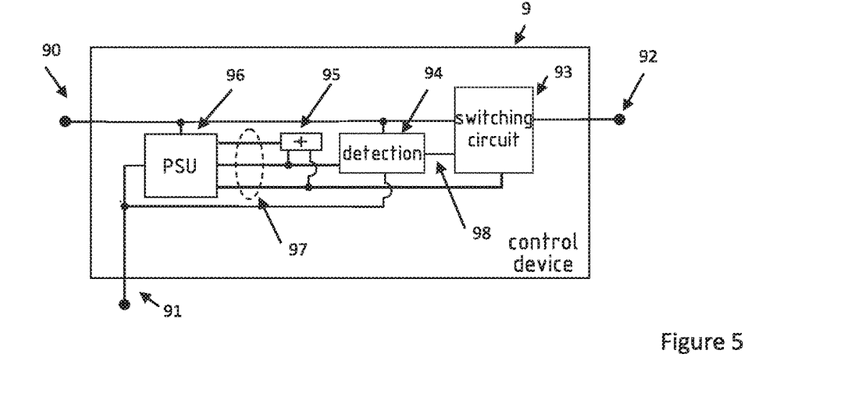
FIG. 5 shows a remote switch control device according to the invention.

FIG. 5 shows a remote switch control device 9 for activating and deactivating of an electrical appliance according to the invention.

The remote switch control device 9 comprises an first terminal 90 connectable to a first line of a power line, a second terminal 91 connectable to a second line of the power line and a third terminal 92 connectable to a power supply terminal of the electrical appliance.

The remote switch control device 9 could be integrated within a single casing. Alternatively, remote switch control device 9 could be distributed within a plurality of distinct elements or units electrically cooperating together.

The remote switch control device 9 could be installed directly behind the plug outlets of a home.

The remote switch control device 9 could be installed directly behind or within an electrical appliance. The electrical appliance could be a light appliance, an electrical home appliance, a home automation electrical appliance or an electrical motor equipped appliance.

The remote switch control device 9 comprises a controllable switching circuit 93 adapted to modify up to break the electrical connection between the first terminal 90 and the third terminal 92, and a detection circuit 96 adapted to detect an attenuation of an electrical parameter between the first and the second terminal 90,91 and to control the controllable switching circuit 93 via a command wire 98. In particular, the detection circuit 96 could be arranged to detect an electrical interruption on a power line connected to the first 90 or to the second terminal 91 of the device 9.

The first terminal 90 could be connected to a phase line 8 of the power line, while the second terminal 91 could be connected to the neutral line 7 or the ground of the power line.

Alternatively, the first terminal 90 could be connected to the neutral line 7 or the ground of the power line, while the second terminal 91 could be connected to the phase line 8 of the power line.

Advantageously, the power line could be a 100-400V, AC single-phase power line.

The first terminal 90 could be connected to a first line of a DC power line, while the second terminal 91 could be connected to a second line of the DC power line. The first line could be electrical connected either to the positive pole or to the negative pole of a DC power supply, while the second line is connected to the antagonist pole of the DC power supply.

According to the invention the power attenuation could be an abnormal and abrupt modification of an electrical parameter, e.g. power, voltage, effective rms voltage, current, or effective current, on a power line, i.e. a modification not statistically attributable to electrical intrinsic characteristics or employ of the power line.

In particular, the attenuation could be a substantial attenuation of the electrical voltage, power and/or current provided by a DC power line, and/or a substantial interruption of the electrical voltage and/or current provided by a DC power line.

In particular, the attenuation could be an attenuation of the amplitude the electrical voltage and/or current provided by a AC power line, a substantially and abnormal modification of the frequency of the electrical voltage and/or current provided by a AC power line, a phase shifting of the frequency of the electrical voltage and/or current provided by a AC power line, and/or a substantial interruption of the electrical voltage and/or current provided by a AC power line.

Advantageously, the detection circuit 96 could detect the attenuation up to an electrical interruption at the input terminal 90 by surveying and/or checking the voltage drop between the first and the second terminal 90,91. A predefined attenuation level could be thus defined in order to signalize a detection of an attenuation and/or of an interruption.

The detection circuit 96 could be arranged to detect the attenuation by surveying and/or checking the electrical voltage between the first and the second terminal 90,91 in order to detect an appearance of frequencies within a predefined frequency range. The range could be thus so defined to covers frequencies statistically or substantially attributable to electromechanically switch commutation.

In case of the presence of a switch 1,10 equipped with a shaping circuit or element 5 operating on a AC power line, the detection circuit 96 could be arranged to detect the attenuation by surveying and/or checking the electrical voltage between the first and the second terminal 90,91 in order to detect an appearance of frequencies within a predefined frequency range. The range could be defined to exclude frequencies statistically or substantially attributable to classical 50 Hz/60 Hz AC frequency holder or sine wave.

In case of the presence of a break-before-made switch equipped with a shaping circuit or element 5 operating on a AC power line, the detection circuit 96 could be arranged to detect the attenuation by surveying and/or checking the electrical voltage between the first and the second terminal 90,91 in order to detect an appearance of a phase shift of the voltage frequency within a predefined frequency shift range. The predefined range could be thus defined to exclude phase shifts statistically or substantially attributable to electrical noises of power supplying or distribution devices or arrangements.

In case of the presence of a break-before-made switch equipped with a shaping circuit or element 5 operating on a AC/DC power line, the detection circuit 96 could detect an attenuation up to a power interruption at the input terminal 90 by surveying and/or checking the voltage or the voltage amplitude between the first and the second terminal 90,91 in order to detect a predefined drop slope or a drop slope within a predefined slope range. The predefined dropping slope could be thus defined in order to exclude slopes that are statistically or substantially attributable to electrical noises of power supplying or distribution devices or arrangements.

A plurality of ranges could be defined in order to recognize or identify the break-before-made switch that is generating/have generated the detected attenuation.

The detection circuit 96 could be arranged to detect an attenuation, in particular of an electrical interruption, on a power line in a predefined period that is comprised in a range from 10 μs to 2 s. The expressed units are SI units, i.e. the unit 'μs' represents microseconds, i.e. $10^{-6}$ seconds, and the unit 's' represents second.

In case of lighting appliances, tests have shown that the detection circuit 96 could be arranged to detect an attenuation, in particular of an electrical interruption, of a power line lasting a period that is comprised in a range from 100 μs to 500 ms and, in particular from 10 ms to 100 ms. The 'ms' unit represents milliseconds, i.e. $10^{-3}$ seconds, according to the SI units standard.

The remote switch control device 9 permits to use a switch 1 that is a simple mono-stable switch ON-OFF configured to break the electrical connection as long as the switch is actuated (push button). In such case, for activating/deactivating the electrical appliance, the user has to shortly actuate this switch in such a way to generate an attenuation whose period is comprised within the predefined range (e.g. less than the predefined max duration) of the detection circuit 96, e.g. less than 2 s, better less than 500 ms.

The electromechanical switch 1 could be configured to generate an attenuation whose duration is within a predefined min/max period independently from the actuating gesture of the user on the switch 1, i.e. the duration is substantially unmodifiable by the gesture. The switch 1 could generate successive attenuations whose durations could vary within the predefined range.

In case of 50-60 Hz AC signal, the detection circuit 96 could be arranged to detect an attenuation, in particular an interruption, of the AC signal from $\frac{1}{2000}$ cycle to 100 cycles. Tests have shown that the detection circuit 96 could be arranged to detect an attenuation, in particular an interruption, of the AC signal lasting from $\frac{1}{200}$ cycle to 25 cycles, and in particular from $\frac{1}{2}$ cycle to 5 cycles.

In the sense of the invention, the unit 'cycle' refers to AC cycle, i.e. to AC frequency$^{-1}$.

The detection circuit 96 could be further been arranged to detect the predefined voltage pattern generated by the shaping circuit 5 in order confirm a detection of an attenuation of an electrical parameter generated by a switch 1. Moreover, a detection of a predefined pattern could provide information about the switch having generated the detected attenuation.

The detection circuit 96 could be further been arranged to generated a predefined electrical signal on one of his terminal in respond of a predefined voltage pattern. Alternatively, the detection circuit 96 could comprise a dedicated terminal on which the predefined electrical signal could be send to the electrical appliance or to other electrical devices.

The remote switch control device 9 could further comprise a communication interface or system. The communication interface could be arranged to communicate by power line communication over the first, the second and/or the third terminal 90,91,92 of the remote switch control device.

The communication interface or system could a Power Line communication interface or system.

The communication interface could also be a radio interface. The communication interface could comprise an electrical circuit and/or a microprocessor. The communication interface could cooperate with the detection circuit 96, e.g. by sharing at least part of the electrical circuit and/or the microprocessor. The communication interface could collect and send information about a state of the remote switch control device 9 and/or about a state of the detection circuit 96 and or about a state of the controllable switching circuit 93. The information could comprise additional information that are stored in a local memory equipping the remote switch control device 9 and/or the detection circuit 96, e.g. an electronically identity of the remote switch control device and or release numbers of components of the remote switch control device. The communication interface could collect and send information provided by other electronic circuits equipping the remote switch control device 9, e.g. ambient or human detection sensors, human-machine interfaces and/or user interface.

The communication interface can be used to send the information that the switch has been activated. This communication interface can also receive the information to turn-on or off or dim the load.

The detection circuit could have an initial or default state, wherein the electrical connection between the first terminal 90 and the third terminal 92 is interrupted. This state could provide safety grade in case of electrical hazard or after an electrical overvoltage or blackout.

Each time the detection circuit detect an attenuation of an electrical parameter and/or a predefined voltage pattern, the detection circuit could lead a change of the state of the electrical connection between the first terminal 90 and the third terminal 92, between a connected state and an interrupted state by commanding the controllable switching circuit 93.

The controllable switching circuit 93 could comprise an electrically operated switch. For example, an electromagnet-based relay or solid-state relay could be used to controllably break the electrical connection between the first terminal 90 and the third terminal 92.

The controllable switching circuit 93 could comprise a transistor arranged to controllably modify up to break the electrical connection between the first terminal 90 and the third terminal 92. The transistor could further provide an electrical attenuation up to a substantially break of the electrical connection in order to provide, for example, dimmer functionality.

The controllable switching circuit 93 could comprise a bidirectional triode thyristor, often called TRIAC, arranged to controllably break the electrical connection between the input terminal 90 and the output terminal 92. The bidirectional triode thyristor could enables or stops of positive and/or negative current applied to its gate electrode providing a control of the direction of current flowing between the first terminal 90 and the third terminal 92.

A plurality of predefined voltage attenuation levels, a plurality of voltage slope ranges, a plurality of frequency range, a plurality of phase shift ranges and/or a plurality of voltage pattern could be defined so that the detection circuit could activate the controllable switching circuit 93 in order to generate predefined electrical connection between the first and the third terminal 90,92. Such predefined electrical connection could enable particular functionalities of electrical appliance or home automation devices, for example dimmer-like functionalities.

For example, the controllable switching circuit could be arranged to electrically attenuate the electrical connection between the first terminal and the third terminal, from 0% up to 100%.

For example, a detection of an attenuation value comprised in a first predefined range by the detection circuit 96 could conduct the detection circuit 96 to drive the controllable switching circuit 93 in a first predefined manner, for example providing a first predefined electrical attenuation of the electrical connection between the first and the third terminal 90,92 or by stopping the current flowing in a predefined direction between the first and the third terminal 90,92. A detection of an attenuation value comprised in a second predefined range could conduct the detection circuit 96 to drive the controllable switching circuit 93 in a second predefined manner, for example providing a second predefined electrical attenuation of the electrical connection between the first and the third terminal 90,92 or by stopping the current flowing in a the opposite direction of the predefined direction between the first and the third terminal 90,92.

Eventually, each time the detection circuit detect a predefined attenuation of an electrical parameter and/or a predefined voltage pattern, the detection circuit could be arranged to generate a command signal within the remote switch control device 9 or externally to the electrical appliance, this without changing the current state of the electrical connection between the first terminal 90 and the third terminal 92.

Advantageously, the remote switch control device 9 of FIG. 5 could comprise a power supply 96 powering the controllable switching circuit 93, the detection circuit 94 from the first 90 and/or second terminal 91. The remote switch control thus provides in particular a remote switch controlling for activating and deactivating of an electrical appliance, requiring neither additional electrical line for command transmission nor additional line for power supply.

The remote switch control device 9 could comprises an electrical energy storing element 95 in order to provide power supply to the controllable switching circuit 93 and the detection circuit 94 at least during the attenuation of an electrical parameter of a power line or during the electrical interruption on a power line. Advantageously, the energy storing element 95 could be or could comprise a rechargeable energy storing element powered by the power supply 96 of the device 9. The energy storing element 95 could consist in a capacitor.

Alternatively, the remote switch control device 9 could be arranged to power down during a substantial power interruption occurring at the first 90 and/or at the second terminal 91 of the device 9. In this configuration, detection circuit 94 could be arranged to change the state of the electrical connection between the first terminal 90 and the third terminal 92 each time the remote switch control device 9 is power up by a re-establishment of the powering at the first 90 and/or at the second terminal 91 of the device 9.

In case a substantial power interruption occurring at the first 90 and/or at the second terminal 91 of the device 9 and lasting more than a predefined period, the remote switch control device 9 could be further arranged to maintain the state of the electrical connection between the first terminal 90 and the third terminal 92 when the remote switch control device 9 is newly power up, and arranged to send a predefined message on one of the lines of the remote switch control device 9.

The electrical appliance could be an electrical load of an electrical device. In such case, parts of the remote switch control device 9 could be advantageously located within the casing of the electrical device, e.g. the controllable switching circuit 93 could be part of the electrical device itself. Advantageously, the remote switch control device 9 could be thus comprises a remote switch control device module that is devoid of the controllable switching circuit 93, as this element could be part of electrical device, electrical appliance or of a secondary operational unit of the remote switch control device 9. The remote switch control device module could thus be configured for electrically controlling the controllable switching circuit that could be physically located within the electrical device, the electrical appliance or the secondary operational unit. This remote switch control device module could thus comprises the detection circuit 94 powered by the power supply circuit 95 and eventually by the electrical Energy storing unit 95, these circuits having electrical connections with the first and second terminal 90, 91 in such a way to be powered and to be able to provide a detection of an attenuation of an electrical parameter between these terminals. The main remote switch control device unit could thus arranged to provide an electrical connection with the command wire 98 of the detection circuit 96 to the controllable switching circuit 93 in such a way to control it. As mentioned, the secondary operational unit, i.e. the controllable switching circuit 93, could be part of the electrical device in such a way to control the activation and deactivation of the electrical appliance.

Figure 6:
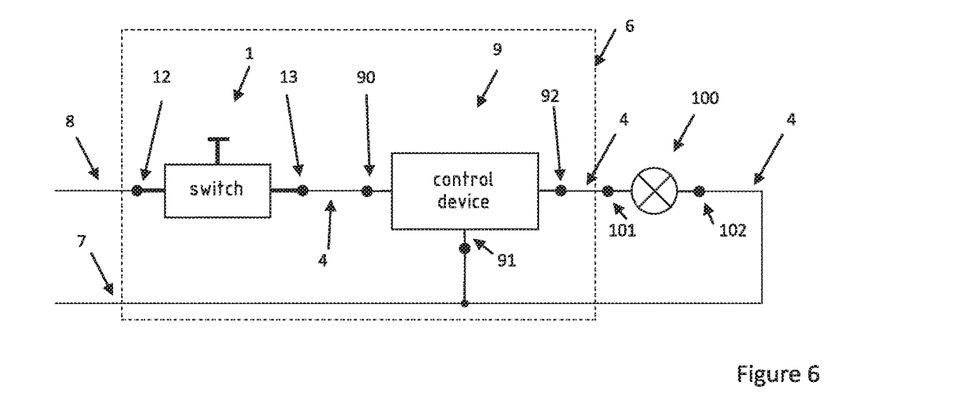
FIG. 6 shows a first of a switching system according to the invention.

FIG. 6 shows a first embodiment of a switching system 6 comprising one of the above mentioned remote switch control device 9 and the electro-mechanical switch 1 for an activation and a deactivation of the electrical appliance 100.

The electrical appliance 100 of the FIG. 6 is controlled by means of a one-way portion 4 of the power line 7,8 that is connected to one of his electrical terminal 101, while the other electrical terminal 102 is electrical connected to the neutral line of the power line 7,8.

The switching system 6 of FIG. 6 comprises the remote switch control device 9 and the switch 1 and the electrical appliance 100 having a power supply and a neutral terminal 101, 102. The power line comprises a phase-line 8 and a neutral line 7. The power line could be, for example a 100-400V, AC single-phase power line.

The switch 1 is electrically connected between the phase-line 8 of the power line and the first terminal 90 of the remote switch control device 9, i.e. one of the switch terminals 12,13 is electrically connected to the power line while the other switch terminal 12,13 is electrically connected to the first terminal 90 of the remote switch control device 9 in such a way to operate on the electrical connection between the first terminal 90 and the power line source 8.

The remote switch control 9 could be installed anywhere an access to the neutral line 7 is possible so to electrical connect his second terminal 91 to the neutral line 7 of the power line.

Typically in the building domain, the first and the second line of the power line 7,8 could follow physically separate paths within building walls and ceiling portions, the paths starting, either from the electrical terminals of the electrical appliance, or from the electrical terminals of the power plug outlet, and ending into the switchboard.

In such case, the remote switch control device 9 could be located near the electrical appliance (or the power plug outlet, typically a wall- or surface-mounted power plug outlet) in such a way to have access to the neutral line 7 starting from the electrical appliance, or from the electrical plug outlet, respectively. The switch 1 is thus electrically connected to the remote switch control device 9 by means of the one-way portion 4 initially destined to powering the electrical appliance 100 (or the power plug outlet).

In case of a power plug outlet, notably a wall- or surface-mounted power plug outlet, the remote switch control device 9 could advantageously mounted behind the power plug outlet in such a way to render it not visible nor accessible by a user.

The switching system 6 thus provides full operability in such conditions where the access to power line is locally restricted and/or limited and where an additional cable is not possible or awkwardly installable, e.g. one-way controlled lighting or one-way powered/earth grounded plug outlet.

In particular, the switching system 6 thus provides full operability wherein the electrical appliance is permanently installed on (or inside) an internal or external wall or ceiling of a building and wherein the electrical appliance is controlled by an one-way line that is directly integrated, e.g. cemented, within the building elements.

Figure 7:
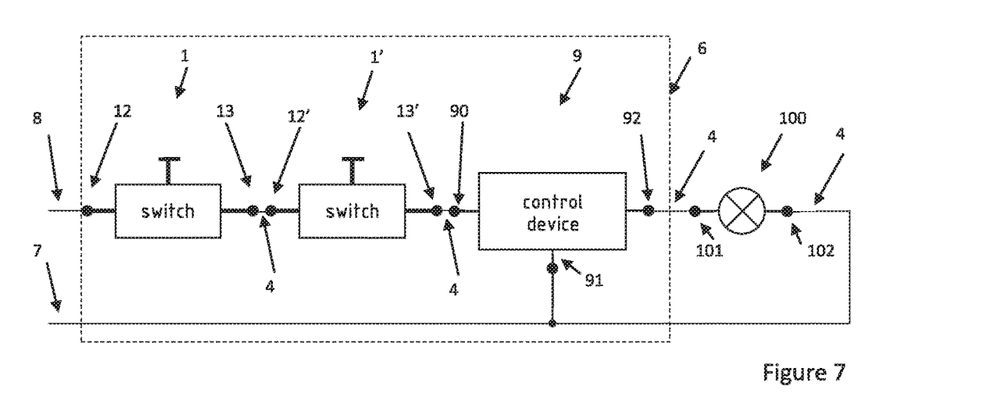
FIG. 7 shows a second embodiment of a switching system according to the invention.

FIG. 7 shows a switching system 6 interconnecting a plurality of switches 1, 1' operating on a one-way line portion 4 electrical relying the remote switch control device 9.

The switching system 6 permits to insert an unlimited number of switches that operate between the power line 8 and the first terminal 90 of the remote switch and/or between the power line 7 and the second terminal 91 of the remote switch, this without requiring an installation of additional control/power wires.

As well known, in home lighting systems, a plurality of electromechanical switches are commonly interconnected together by means of at least one multiple-way wiring in order to activate and deactivate one or more lighting appliances. Commonly, break-before-make switches are employed in such circuits and the multiple-way wiring is a two-way wiring.

Figure 8A:
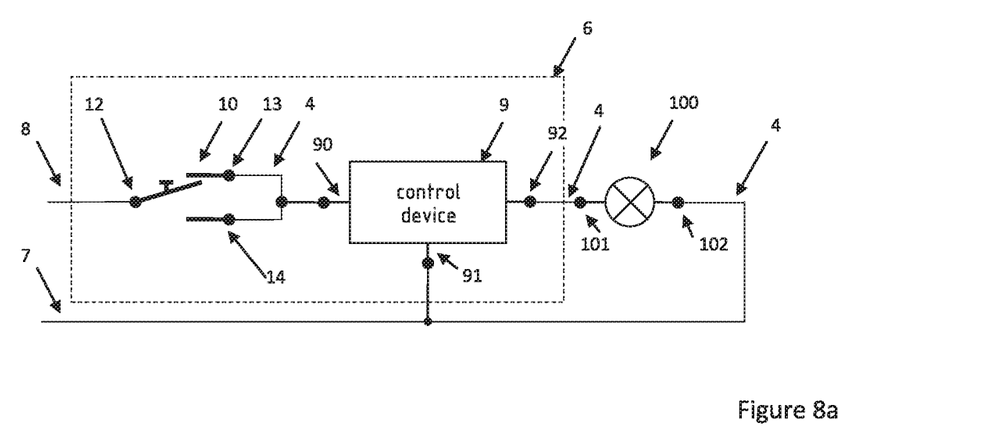
FIGS. 8*a,b* show two variants of third embodiment of a switching system according to the invention.

FIGS. 8*a,b* show two variants of a third embodiment of switching system 6. These variants comprises one of the above mentioned remote switch control device 9 adapted to activate and deactivate an electrical appliance 100 having a power supply and a neutral terminals 101, 102. The break-before-made switch 10 of FIG. 1b is electrically connected between either a phase-line 8 (FIG. 8a) or a neutral line 7 (FIG. 8b) and the first terminal 90 of the remote switch control device 9.

Figure 8B:
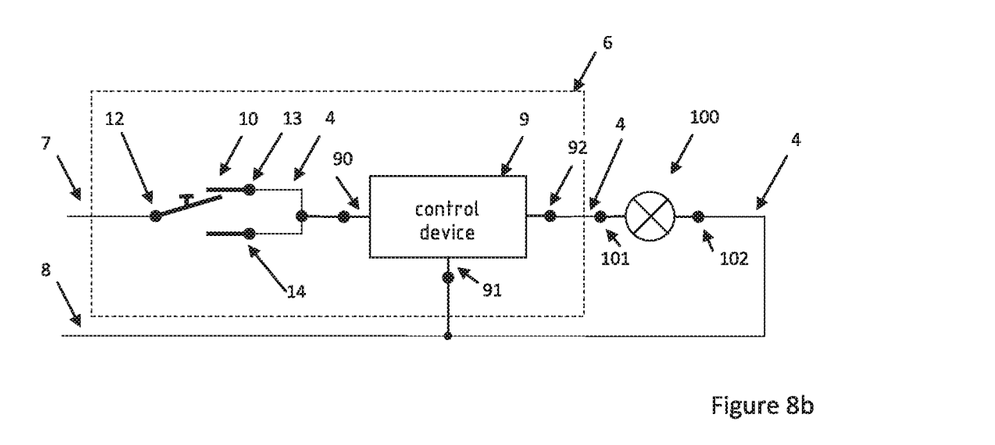

The switch 10 has a first contact 12 that can be connected to either one of a second and a third contact 13,14 of the switch 10, wherein said second and third contacts 13,14 of the switch are electrically connected together. The second and third contacts 13,14 of the switch 1 could be electrically connected by short-circuiting both terminals 13,14 together.

The switch 1 could be electrically connected to either the phase-line 8 or neutral line 7 of a power line by electrically connecting the first terminal 12 of the switch 1 to either the phase-line 8 or the neutral line 7, while the second and the third terminals 13,14 of the switch 1 are electrically connected to the input terminal 90 of the remote switch control device 9.

Alternatively, the switch 1 could be electrically connected to either the phase-line 8 or neutral line 7 of a power line by electrically connecting the second and the third terminals 13,14 to either the phase-line 8 or the neutral line 7, while the first terminal 12 of the switch 1 is electrically connected to the input terminal 90 of the remote switch control device 9.

The third terminal 92 of the remote switch control device 9 is electrically connected to a power supply terminal 101 of an electrical appliance 100, wherein the second terminal 91 is electrically connected to a neutral line of the power line.

The neutral terminal 102 of the electric appliance is electrically connected to a neutral line or wire 7.

The appliance 100 could be a home light appliance.

The appliance 100 could be an electrical appliance electrically connected by means of an electrical plug inserted in a power plug outlet so that the terminals 101,102 are electrically connected to the third terminal 92 and to a neutral line or ground.

The remote switch control device 9 could be integrated in the electrical appliance 100, e.g. in a home light appliance or light bulb.

Figure 9A:
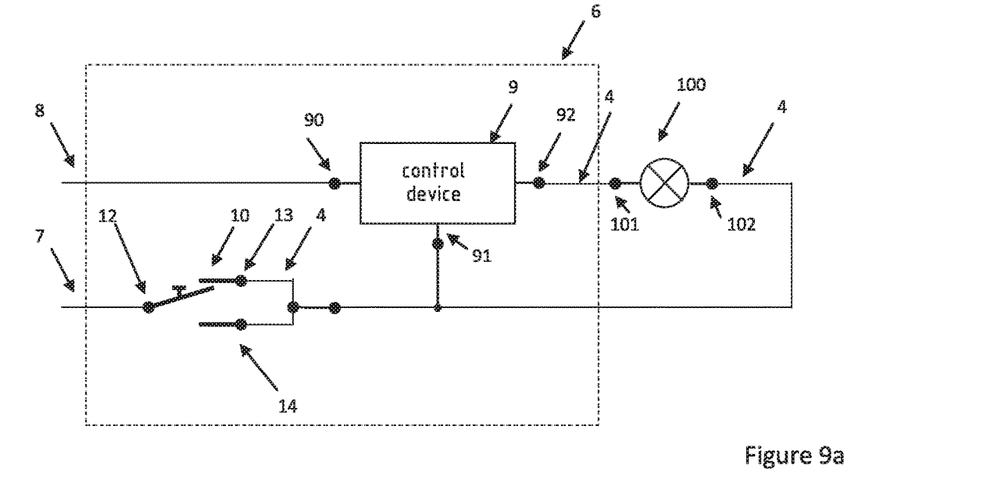
FIGS. 9*a,b* show two variants of a fourth embodiment of a switching system according to the invention.

Alternatively or additionally to the arrangement of the FIG. 8a, a break-before-make switch 10 could be electrically connected between a neutral line 7 of a power line and the second terminal 91 of the remote switch control device 9, as illustrated in FIG. 9a. The first terminal 90 of the device 9 is electrically connected to a phase line 8 of a power line. One terminal 101,102 of the appliance 100 is electrically connected to the third terminal 92 of the device 9 while the other terminal 101,102 of the appliance 100 is electrically connected to the second terminal 91 of the device 9.

Figure 9B:
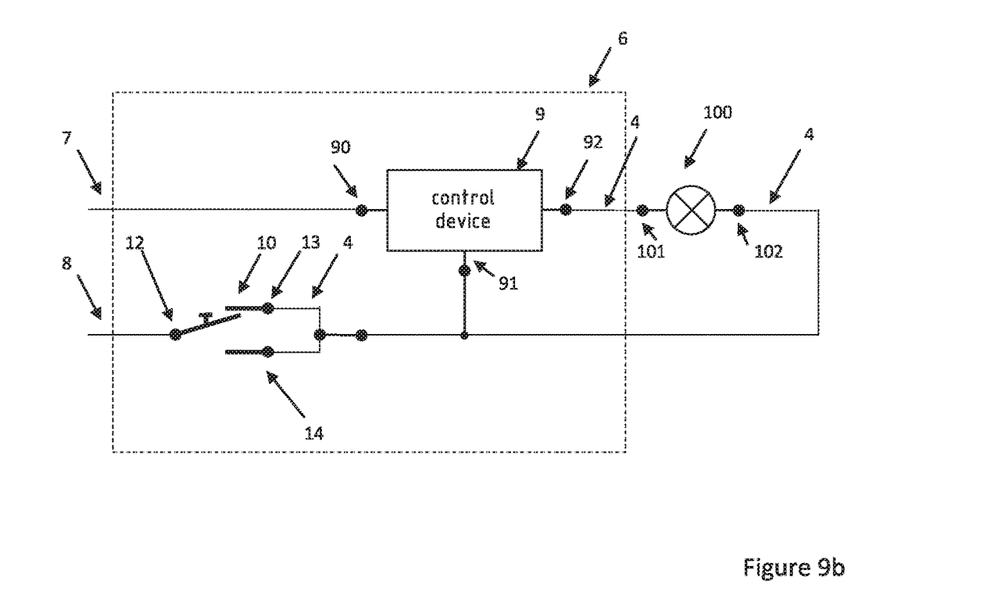

Alternatively or additionally to the arrangement of the FIG. 8b, a break-before-make switch 10 could be electrically connected between a phase line 8 of a power line and the second terminal 91 of the remote switch control device 9, as illustrated in FIG. 9b. The first terminal 90 of the device 9 is electrically connected to a neutral line 7 or ground line of a power line. One terminal 101,102 of the appliance 100 is electrically connected to the third terminal 92 of the device 9 while the other terminal 101,102 of the appliance 100 is electrically connected to the second terminal 91 of the device 9.

As well known, in legacy home lighting systems, a plurality of electromechanical switches are commonly interconnected together by means of at least one multiple-way wiring in order to activate and deactivate one or more lighting appliances. Such switches are commonly connected together by a two-way wiring.

Figure 10:
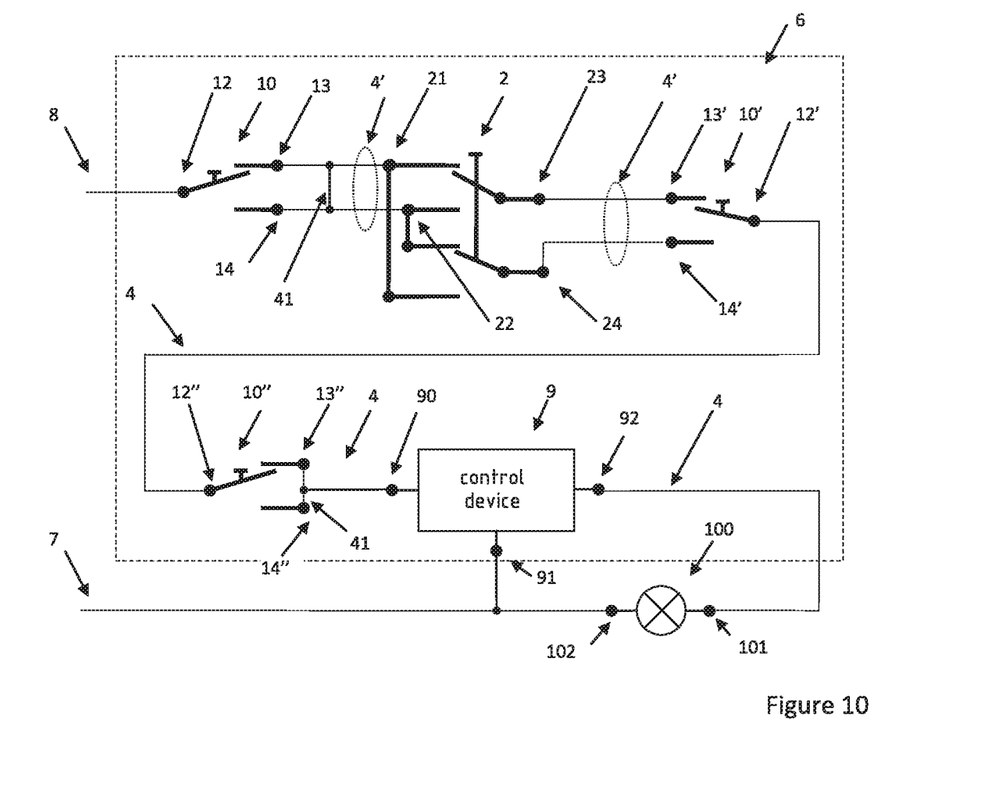
FIG. 10 shows a fifth embodiment of a switching system according to the invention.

FIG. 10 show a switching system 6 comprising a plurality of switches operating on the same remote switch control device 9 for controlling the appliance 100.

The switching system 6 interconnects a group of break-before-make switches 2,10,10' arranged to operate on a two-way wiring 4,4' portion of the power line 8. The switching system 6 further comprises an additional switch 10" operating on a one-way portion of the power line 8. The switch 10" could be, alternatively, replaced by the switch of FIG. 1a.

The switching system 6 provides thus an unlimited interoperability between switches 1,10 operating on a 1-way circuit and switches 2,10,10' operating on a 2-way circuit of a power line in such a way that all of such switches could be co-operate with the others for activating and deactivating the same electrical appliance 100, without requiring an installation of additional control/power wires.

The first terminal 12 of the first switch 1 is electrically connected to a phase line 8 of a power line while the first terminal 12' of the second switch 1' is electrically connected to the first terminal 90 of the remote switching control device 9. The second and third contacts 13,14 of the first switch 1 are electrically connected to the second and third contacts 13',14' of the second switch 1' through a two-way wiring 4.

An intermediate switch 2 could be electrically inserted in-between the first and the second switches 10,10" as known in the art.

The above-mentioned electrical connection between the first and the second switch is a common two-way wiring arrangement commonly used in traditional home lighting circuits.

According to the invention, the second 13 and third terminal 14 the first switch 1 are electrically connected together. An electrical connection between the second and third terminals 13,14 could be realized by short-circuiting the second and third terminals 13, 14 of the first switch by means of an electrical plate or wire 41. The electrical connection 41 could be located internally the switch casing or near the switch location of switch 1.

Alternatively, the electrical connection between the second and third terminals 13,14 of the first switch 1 could be realized by short-circuiting the two-way wiring 4 connecting the first and second switches 10,10", for example by means of an electrical plate or wire 41.

Alternatively, the electrical connection between the second and third terminals 13,14 of the first switch 10 could be realized by short-circuiting the second and third terminals 13', 14' of the second switch, for example by means of an electrical plate or wire.

Alternatively, the electrical connection between the second and third terminals 13,14 of the first switch 10 could be realized by short-circuiting a couple of terminals of the intermediate switch 2.

The switching system 6 of FIG. 10 further comprises a 1-way wire electrically connecting the first terminal 12' of the second switch 10' to the first terminal 12" of a third break-before-make switch 10". The second terminal 13" and third terminal 14" are electrically connected together and electrically connected to the first terminal 90 of the remote switch control device 9.

The invention concerns thus a method for installing a switching system for activating and deactivating an electrical appliance (100) having a first and a second power supply terminals (101, 102).

The method comprises a step of installing the switching system 6. This step comprises a step of electrically connecting the first terminal 90 to the first line of a power line 7,8, the second terminal 91 to the second line of the power line 7,8, and the third terminal 92 to either the first power supply terminal (102) of the electrical appliance (100) or to an electrical connector of a power plug outlet suitable for powering the electrical appliance 100.

The method comprises a step of installing the electromechanical switch 1,10 for being electrically connected either between the first line 7,8 and the first terminal 90 of the remote switch control device 9 or between the second line 7,8, and the second terminal 91 of said remote switch control device 9.

In the case where the employed electromechanical switch is a break-before-make switch 10, the installation step comprises a step of electrically connecting the second 13 and the third 14 contacts together.

The above-mentioned steps of installing could be executed is any time-related sequence.

LIST OF ELEMENTS USED IN DRAWINGS

1,1' Switch
10,10',10" Break-before-made switch
12,13,14 Contacts
12',13',14' Contacts
12",13",14" Contacts
2 Intermediate switch
21-24 Terminals
4,41 Electrical connection
4' Two-way wiring
5 Shaping circuit
50,51 Terminals
6 Switching system
7 Neutral line
8 Phase line
9 Control device
90 Input terminal
91 Neutral terminal
92 Output terminal
93 Switching circuit
94 Detection circuit
95 Electrical Energy storing unit
96 Power supply circuit
97 Internal power supply connections
98 Command wire
100 Electrical appliance
101,102 Terminals

We claim:

1. A switching system for activating and deactivating of an electrical appliance, the switching system comprising
a remote switch control device that comprises:
a first terminal electrically connected to a first line of a power line;
a second terminal electrically connected to a second line of the power line and electrically connectable either to a first power supply terminal of the electrical appliance or to a first electrical terminal of a power plug outlet for powering the electrical appliance;
a third terminal connectable either to a second power supply terminal of the electrical appliance or to a second terminal of the power plug outlet;
a controllable switching circuit arranged to modify the electrical connection between the first terminal and the third terminal; and
a detection circuit arranged to detect an attenuation of an electrical parameter, and arranged to control said controllable switching circuit;
the switching system further comprising
a first electromechanical switch operating on an electrical connection linking a first and a second electrical contact and configured to be manually actionable by a user; wherein the first electromechanical switch is configured to act on the electrical connection linking in such a way to produce, when actuated, a modification of an electrical parameter of the electrical connection linking the first and second electrical contacts; and
wherein said first electromechanical switch is electrically connected between the first line and the first terminal of said remote switch control device or between the second line and the second terminal of said remote switch control device.

2. The switching system of claim 1, the first electromechanical switch being configured, when actuated, to generate a modification of the electrical parameter of the electrical connection linking the first and second electrical contacts during a time period in a range from 10 µs to 2 s.

3. The switching system of the claim 1, wherein the detection circuit is configured to act on the controllable switching circuit when the detected attenuation lasts for a period in a range from 10 µs to 2 s.

4. The switching system of claim 1, wherein
said first electromechanical switch is electrically connected between the first line of the power line and the first terminal of the remote switch control device; and
wherein said first line is a phase line of the power line and the second line is a neutral line of the power line.

5. The switching system of claim 1, the first electromechanical switch being a break-before-make switch configured to electrically connect the first electrical contact to either one of the second and a third electrical contact of the break-before-make switch; wherein the second and the third electrical contacts of the break-before-make switch are electrically connected together.

6. The switching system of claim 1, wherein a second electromechanical switch is electrically connected between the first electromechanical switch and the first or second terminal; the first and the second electromechanical switches are break-before-make switches, wherein the second break-before-make switch is electrically connected between said first break-before-make switch and the first or second terminal of the remote switch control device, and wherein the second and third electrical contacts of the first break-before-make switch are electrically connected to the second and third electrical contacts of the second break-before-make switch through a two-way wiring.

7. The switching system of claim 1, wherein the first electromechanical switch is adapted for home lighting applications, in particular a wall-mounted or surface-mounted switch such as a push button, a toggle and a rocker switch.

8. The switching system of claim 1, wherein the first electromechanical switch is a three-way switch having a common terminal, a second terminal, and a third terminal, comprising a shaping circuit; a first terminal of the shaping circuit being electrically connected to the common terminal, and a second terminal of the shaping circuit being electrically connected to the second terminal and to the third terminal of the first electromechanical switch; said shaping circuit comprising either a capacitor, a resistor, and a diode, or an LC circuit.

9. The switching system of claim 1, wherein the remote switch control device is further configured to receive wirelessly a message and to modify the electrical connection between the first terminal and the third terminal upon a receipt of a predefined message.

10. The switching system of claim 1, further comprising a communication interface or system configured to operate on an electrical connection between the first line and the first terminal of said remote switch control device or between the second line and the second terminal of said remote switch control device; the communication interface or system being configured to, in response of a receipt of a predefined wired or wireless message from a predefined device, to modify an electrical parameter of said electrical connection during a predefined time period, in particular to break said electrical connection.

11. The switching system of claim I, wherein the electrical parameter is one of: electrical power, voltage between the first and second terminals, effective rms voltage between the first and second terminals, current between the first and second terminals, or effective rms current between the first and second terminals.

12. The switching system of claim 1, comprising a shaping circuit electrically connected to the first electromechanical switch, the shaping circuit comprising a processing unit powered by a battery.

13. A remote switch control device for activating and deactivating an electrical appliance comprising:
a first terminal;
a second terminal;
a third terminal connectable either to a first power supply terminal of the electrical appliance or to a first electrical terminal of a power plug outlet for powering the electrical appliance;
a controllable switching circuit arranged to modify the electrical connection between the first terminal and the third terminal;
a detection circuit arranged to detect an attenuation of an electrical parameter and to control said controllable switching circuit;
a communication interface or system configured to collect and send information about a state of the remote switch control device or about a state of the detection circuit or about a state of the controllable switching circuit;
a power supply arranged to power the controllable switching circuit and the detection circuit from the first and/or second terminal; and an electrical energy storing element arranged to power said controllable switching circuit and said detection circuit during said attenuation; wherein said electrical energy storing element is configured to be powered by said power supply.

14. The remote switch control device of claim 13, wherein the first terminal is connectable to a phase line of a power line; and wherein
the second terminal is connectable to a neutral line of the power line.

15. The remote switch control device of claim 13, wherein said attenuation comprises a predefined pattern voltage.

16. The remote switch control device of claim 13, wherein said attenuation is a power interruption.

17. The remote switch control device of claim 13, wherein the first terminal is electrically connected to a first line of a 100-400V, AC power line; wherein the detection circuit (94) is adapted to detect said attenuation of the AC power line in a predefined period that is in a range from $\frac{1}{2000}^{th}$ of a cycle to 100 cycles of the AC power line.

18. The remote switch control device of claim 13, wherein said second terminal is connectable to a second terminal of the power plug outlet; in particular the power plug outlet being a wall- or a surface mounted power plug outlet.

19. The remote switch control device of claim 13, wherein said second terminal is connectable to a second power supply terminal of a lighting appliance, in particular of a lighting fixture or of a chandelier.

20. The remote switch control device of claim 13. wherein the communication interface or system is arranged to communicate by power line communication over the first, the second and/or the third terminal of the remote switch control device.

21. A method for installing a switching system for activating and deactivating an electrical appliance having a first and a second power supply terminals comprising steps of:
installing a remote switch control device comprising: a first terminal, a second terminal, a third terminal, a controllable switching circuit arranged to modify an electrical connection between the first terminal and the third terminal of the switching system, and a detection circuit arranged to detect an attenuation of an electrical parameter, and arranged to control said controllable switching circuit; the detection circuit being configured to act on the controllable switching circuit when the detected attenuation lasts for a period in a range from 10 µs to 2 s;
wherein said step of installing said switching system comprises the step of
electrically connecting the first terminal to a first line of a power line, the second terminal to a second line of the power line and the third terminal to either the first power supply terminal of the electrical appliance or to an electrical connector of a power plug outlet suitable for powering the electrical appliance;
installing an electromechanical switch for being electrically connected between the first line and the first terminal of said remote switch control device or between the second line and the second terminal of said remote switch control device; the electromechanical switch being arranged to operate on an electrical connection linking a first and a second electrical contact of the electromechanical switch and configured to be manually actionable by a user; wherein said step of installing the electromechanical switch comprises the step of:
configuring the electromechanical switch in such a way to produce, when actuated, a modification of an electrical parameter of the electrical connection linking the first and the second electrical contact, during a time period in a range from 10 µs to 2 s;
wherein the electromechanical switch is a break-before-make switch arranged to electrically connect the first electrical contact to either one of the second and a third electrical contact of the break-before-make switch;
wherein said step of installing the electromechanical switch comprises the step of electrically connecting the second and the third electrical contacts together.

* * * * *